United States Patent [19]

Hahn et al.

[11] Patent Number: 5,704,394
[45] Date of Patent: Jan. 6, 1998

[54] VACUUM VALVE WITH INTEGRATED SELECTOR PLATE

[75] Inventors: Sangman Hahn, Carmel; Jeffery A. Price, Kokomo, both of Ind.

[73] Assignee: Delco Electronics Corporation, Kokomo, Ind.

[21] Appl. No.: 746,515

[22] Filed: Nov. 12, 1996

[51] Int. Cl.$^6$ ............................................. F16K 11/06
[52] U.S. Cl. .................................. 137/625.46; 137/353
[58] Field of Search ................................ 137/353, 625.46

[56] References Cited

U.S. PATENT DOCUMENTS

| | | | |
|---|---|---|---|
| 3,073,341 | 1/1963 | Schernekau | 137/863 |
| 3,991,788 | 11/1976 | Kull | 137/863 |
| 4,046,159 | 9/1977 | Pegourie | 137/596.18 |
| 4,049,020 | 9/1977 | Neveux | 137/625.46 X |
| 4,291,725 | 9/1981 | Raab et al. | 137/353 X |
| 4,346,729 | 8/1982 | Frauy | 137/353 |
| 4,466,456 | 8/1984 | Hansen | 137/596.2 |
| 5,406,041 | 4/1995 | Hahn, et al. | 200/61.86 |

FOREIGN PATENT DOCUMENTS

| | | | |
|---|---|---|---|
| 978613 | 4/1951 | France | 137/627 |
| 1015422 | 12/1965 | United Kingdom | 137/636.1 |

*Primary Examiner*—John Fox
*Attorney, Agent, or Firm*—Jimmy L. Funke

[57] ABSTRACT

A rotary valve has a stator with ports for connection to a vacuum source and to a plurality of vacuum actuators, and a housing having a central hub. A selector residing between the stator and the housing comprises a resilient body insert molded to a steel drive plate having a central drive opening for receiving a drive shaft and an array of holes around the central opening. On one side of the plate the body comprises a valve member in contact with the stator and defines passages to selectively interconnect the ports, and on the other side of the plate the body comprises a resilient tubular spring surrounding the hub and pressing against the housing to bias the valve member against the stator.

4 Claims, 1 Drawing Sheet

VACUUM VALVE WITH INTEGRATED SELECTOR PLATE

FIELD OF THE INVENTION

This invention relates to a vacuum valve and particularly to a rotary vacuum valve with a one-piece selector plate.

BACKGROUND OF THE INVENTION

Vacuum valves are useful, for example, in automotive vehicles for controlling heater and air conditioner functions operated by vacuum actuators. A vacuum source is coupled to the vacuum valve and the valve selectively couples the vacuum source to any of several output vacuum hoses connected to the actuators to implement various functions.

A prior art vacuum valve is shown in FIG. 1. A stator 10 comprises a rigid disk 12 which has a center hollow hub 14 and a plurality of ports 16 each associated with a nipple 18. A grommet 20 of molded rubber or other elastomeric material tightly fits over all the nipples 18 and has openings 22 which receive vacuum hoses 24 that connect to a vacuum source and to vacuum actuators. A housing 26 comprises a rigid plastic disk 28 axially spaced from the stator 10 having a central hub 30 in line with the hub 14 of the stator and extending toward the stator, and resilient fingers 32 which snap into engagement with ears 34 on the stator periphery, so that the stator and housing together define a valve enclosure. A selector 36 within the enclosure comprises a molded elastomeric valve member 38 bonded at one face to a steel drive plate 40. The other face of the valve member 38 is formed with a plurality of ribs 42 which engage the stator surface and define labyrinthine passages 44 that interconnect selected ports 16 according to the angular position of the selector 36 relative to the stator 10. The angular position is selected by a manually actuated shaft 46 which is rotatably mounted in the hubs 14 and 30. The end of the shaft 46 has a flat 48 on one side and fits through a D-shaped aperture 50 in the center of the drive plate 40 to rotate the selector 36 to various angular positions according to the desired actuator operations. A coil spring 52 surrounding the hub 30 bears against the housing 26 and the drive plate 40 to bias the valve member 38 against the stator 10 surface. A lubricant is used between the selector and the stator to ease sliding friction and to help sealing.

An earlier version of the vacuum valve used a valve member separate from the drive plate. Thus it was necessary to assemble those two elements as well as the coil spring into the enclosure. Because the three parts are discrete it requires substantial labor to orient the parts in a proper manner. It is possible to misassemble the part; in some cases the valve member is not properly oriented and seated against the drive plate or the valve member and drive plate combination are assembled upside down. The version of FIG. 1 combines the valve member and the drive plate by bonding or by insert molding. This reduces the assembly problems but increases the cost of the parts. Still it requires the assembly of two separate parts into the enclosure and it is possible to assemble the combined valve member-drive plate upside down.

SUMMARY OF THE INVENTION

It is therefore an object of the invention to reduce the number of parts to be assembled in the enclosure of a vacuum valve. Another object is to reduce the incidence of incorrect assembly of such a valve. Still another object is to reduce the cost of such a valve.

A vacuum valve is constructed according to the FIG. 1 description except that the movable elements within the enclosure are combined into one part, i.e., the spring, the valve member and the drive plate are a single unit. A drive plate having a central D-shaped drive aperture and some additional holes is insert molded in an elastomeric material which has the required valve features on one side of the plate and a spring feature on the other side of the plate. Thus there is only the one part to assemble in the enclosure (aside from the later insertion of the drive shaft), and since the resulting part is quite unsymmetrical, it is easier to recognize an upside down part during assembly.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
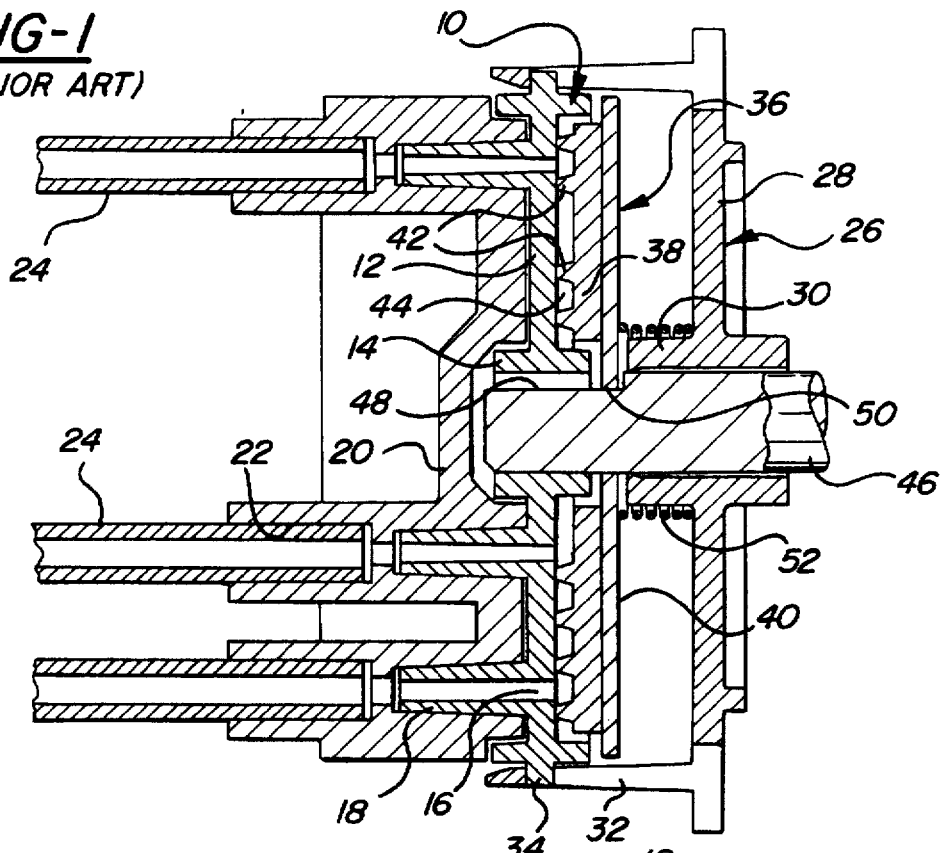
FIG. 1 is a cross section of a vacuum valve according to the prior art.
Figure 2:
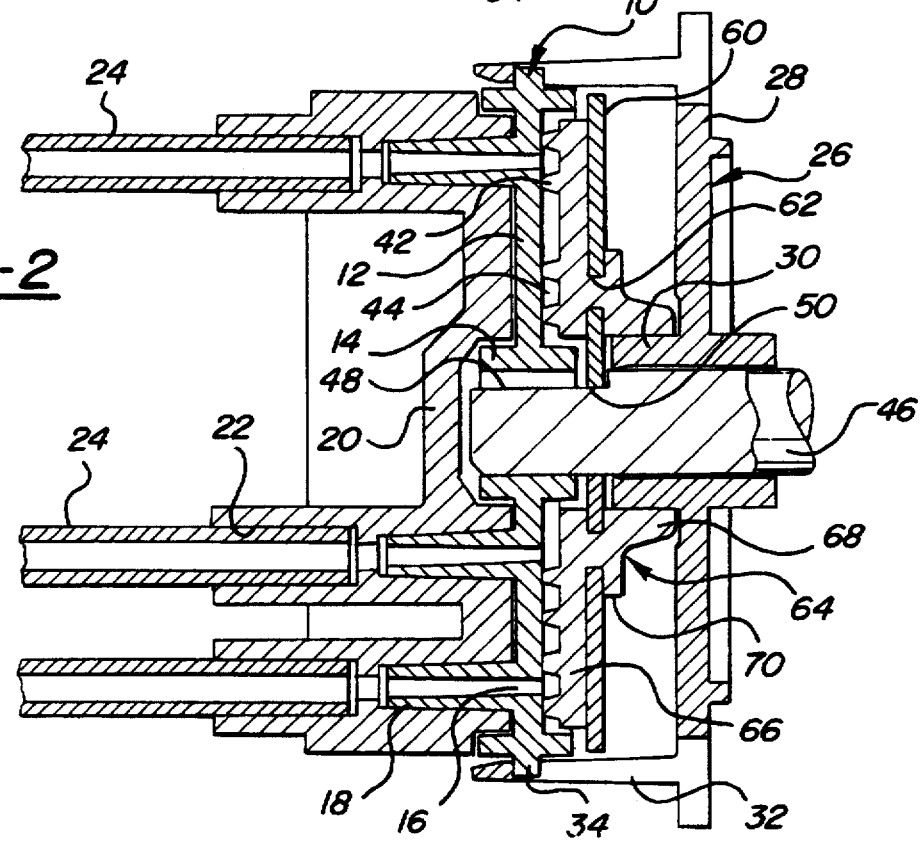
FIG. 2 is a cross section of a vacuum valve according to the invention.

Referring to FIG. 2, it will be recognized that the stator 10 and associated output hardware, the housing 26 and the drive shaft 46 are the same as those disclosed in FIG. 1. The internal mechanism or selector, however, is integrated into a single unit. A steel drive plate 60 has a central D-shaped aperture 50 and an array of holes 62 surrounding the center and aligned with a desired spring location. An elastomeric element 64 is insert molded to the drive plate such that it extends through the holes 62 and is shaped to form a valve member 66 on one side and a tubular spring member 68 on the other side. Molded material 70 surrounding and between the holes 62 lock the element 64 to the drive plate 60. The valve member 66 includes ribs 42 bearing against the stator to define labyrinthine passages 44 to perform the valving function upon rotation of the shaft 46. The tubular spring member surrounds the hub 30 on the housing and bears resiliently against the housing to bias the valve member 66 against the stator. Preferably, the elastomeric element 64 is molded of self lubricated material such as silicone rubber so that it will not be necessary to apply a separate lubricant material to the assembly.

It will be appreciated that by reducing the selector, including the spring, to a single part, the assembly is easier and requires less labor. In addition, the likelihood of installing the part backward is much reduced or eliminated due to the asymmetry of the part. Although the valve design is specific to a rotary device, the invention applies as well to a linear (reciprocating) selector.

The embodiments of the invention in which an exclusive property or privilege is claimed are defined as follows:

1. A vacuum valve comprising:

an enclosure having a housing and a stator spaced from the housing;

the stator having an input port and a plurality of output ports;

selector means between the housing and the stator responsive to the control means for selectively coupling the output ports to the input port to implement a selected function;

the selector means comprising a drive plate having a plurality of holes and a one-piece resilient body molded to the drive plate and extending through the holes; and the resilient body comprising a valve member on one side of the plate for engagement with the stator and a spring member on the other side of the plate in engagement with the housing for biasing the valve member against the stator.

2. The invention as defined in claim 1 wherein:

the selector means has a central aperture for receiving a drive shaft; and the spring member is concentric with the central aperture.

3. The invention as defined in claim 1 wherein the spring member comprises a tubular protuberance in engagement with the housing.

4. The invention as defined in claim 1 wherein:

the housing includes a central hub extending toward the drive plate; and the spring member comprises a tubular protuberance surrounding the hub and engaging the housing.

* * * * *